Figure 1:
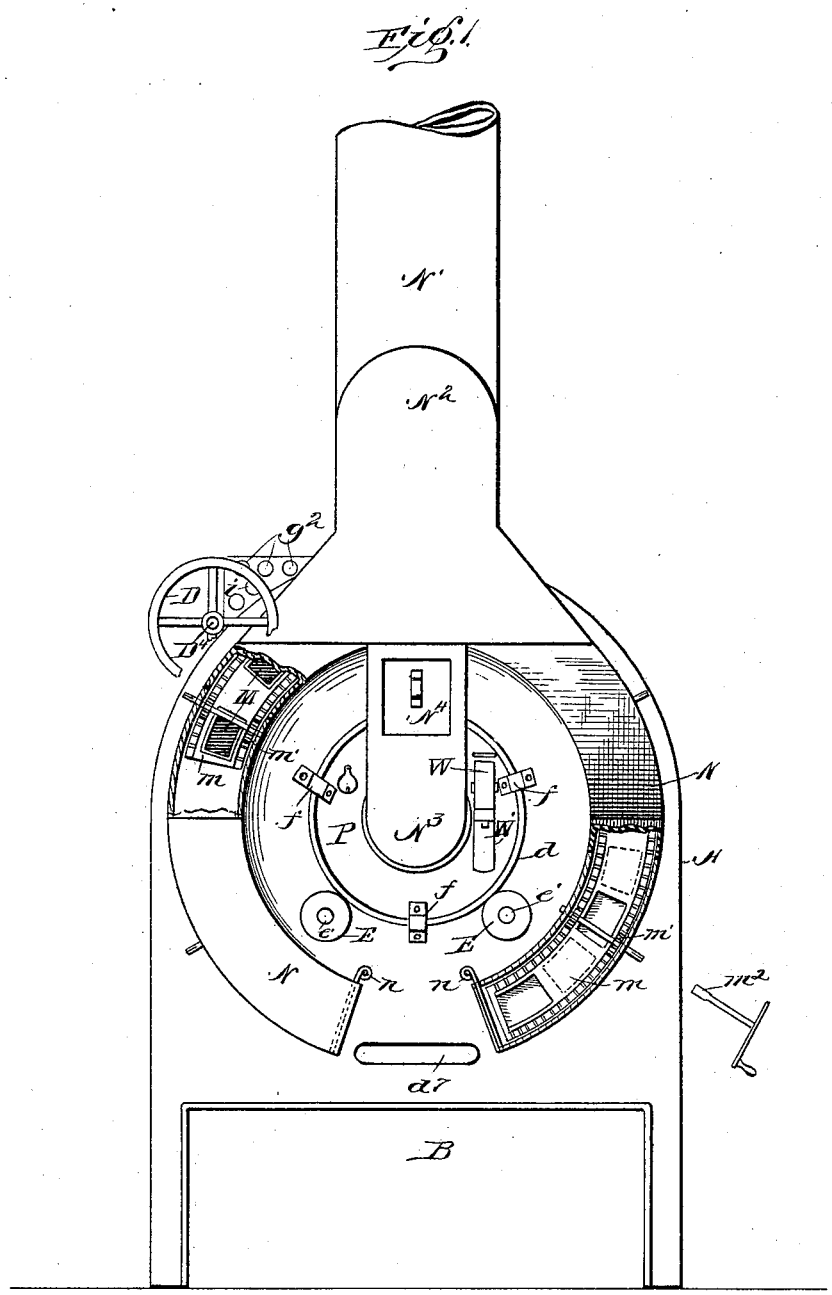

No. 616,790. Patented Dec. 27, 1898.
M. F. HAMSLEY.
APPARATUS FOR ROASTING COFFEE BERRIES.
(Application filed Feb. 8, 1898.)

(No Model.) 5 Sheets—Sheet 1.

Witnesses:
J. M. Fowler Jr.
J. B. Peyton Jr.

Inventor
Millard F. Hamsley,
by Church & Church
his Attorneys.

THE NORRIS PETERS CO., PHOTO-LITHO., WASHINGTON, D. C.

No. 616,790. Patented Dec. 27, 1898.
M. F. HAMSLEY.
APPARATUS FOR ROASTING COFFEE BERRIES.
(Application filed Feb. 8, 1898.)
(No Model.) 5 Sheets—Sheet 2.
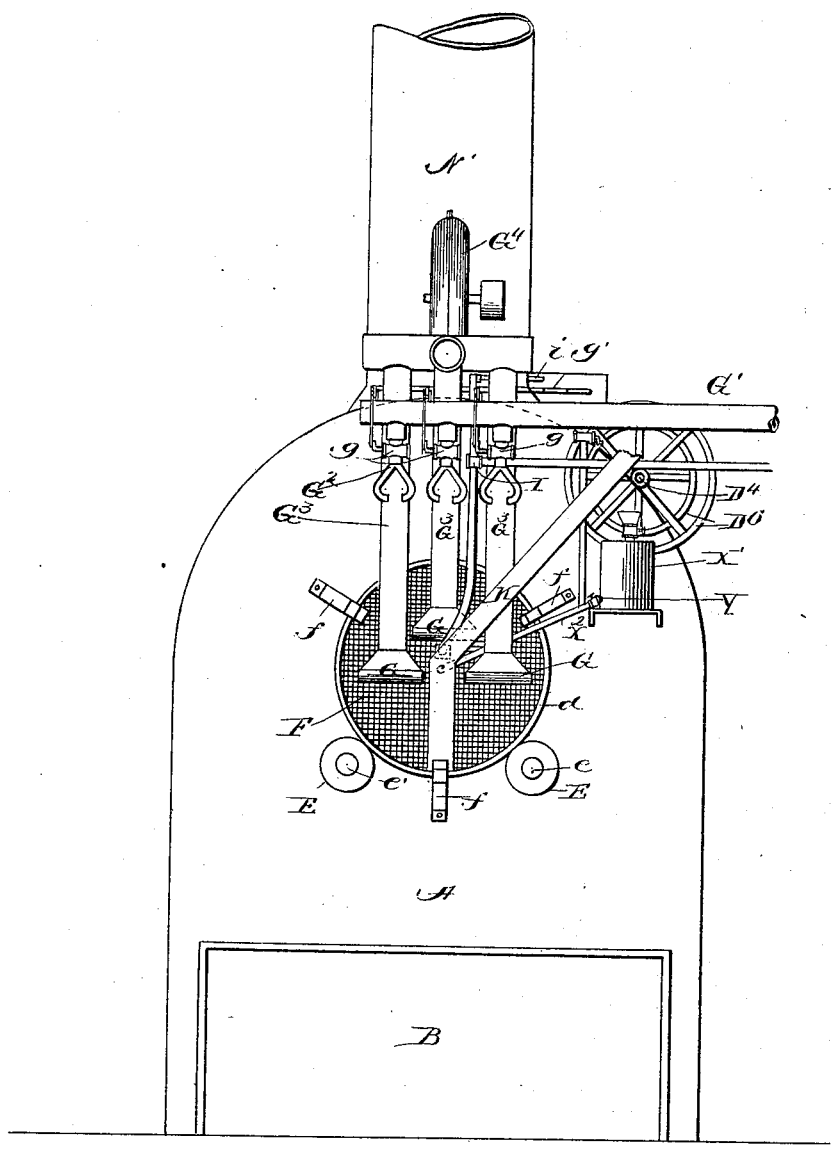

No. 616,790. Patented Dec. 27, 1898.
M. F. HAMSLEY.
APPARATUS FOR ROASTING COFFEE BERRIES.
(Application filed Feb. 8, 1898.)
(No Model.) 5 Sheets—Sheet 3.
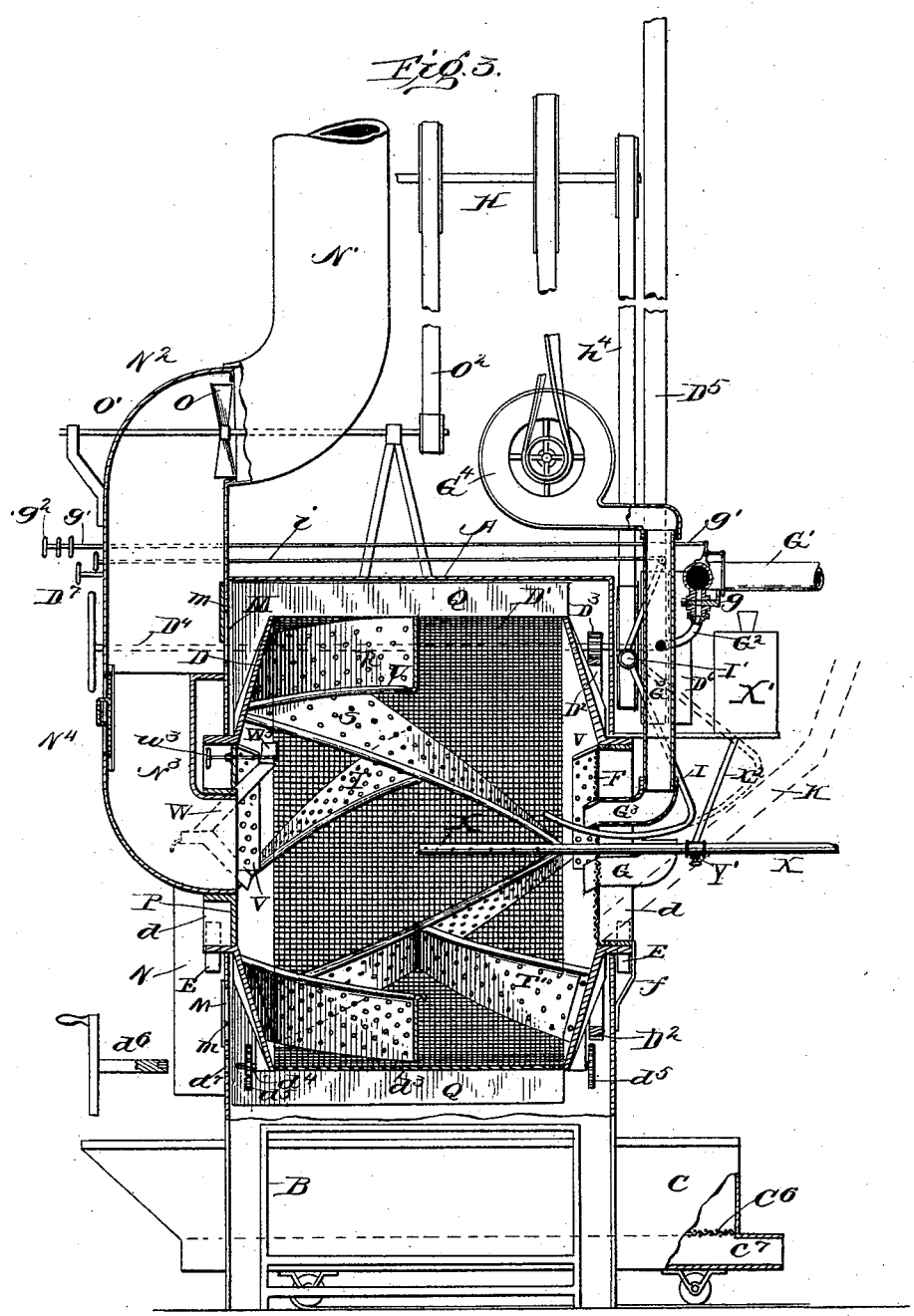
Witnesses:
N. Curtis Lammond
J. B. Peyton, Jr.
Inventor:
Millard F. Hamsley
by Church & Church
his Attorneys

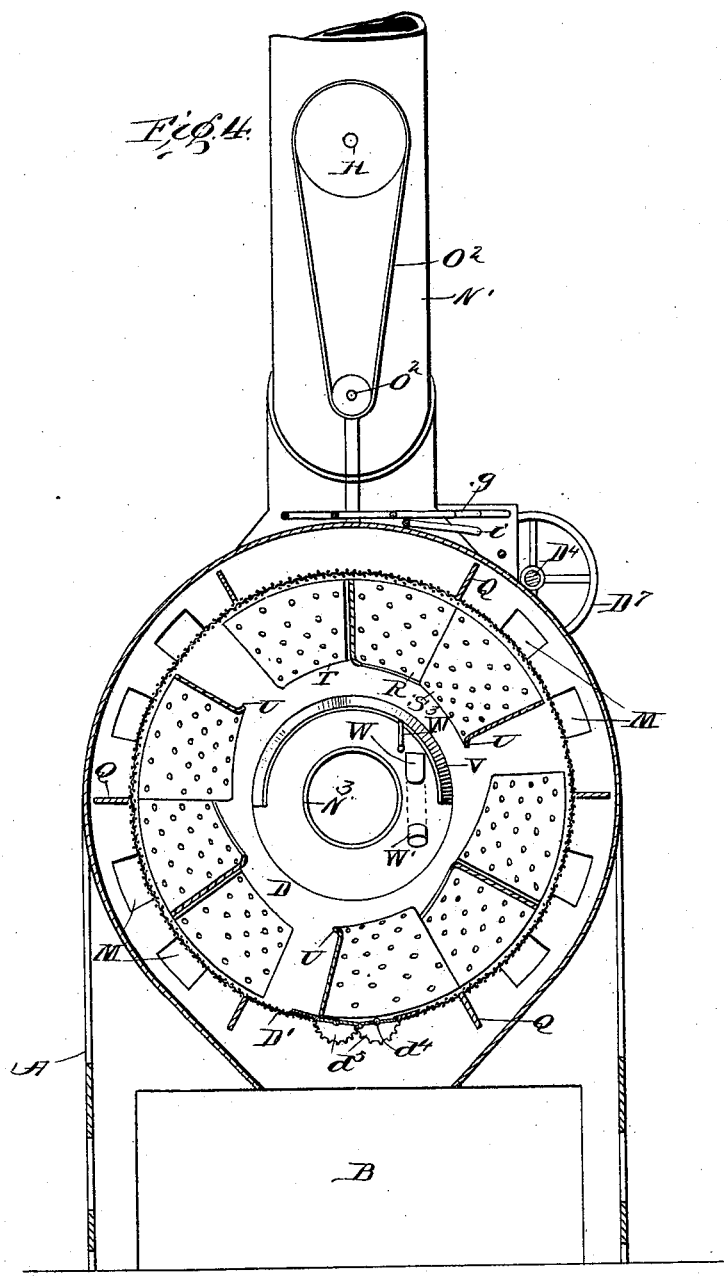

No. 616,790. Patented Dec. 27, 1898.
M. F. HAMSLEY.
APPARATUS FOR ROASTING COFFEE BERRIES.
(Application filed Feb. 8, 1898.)
(No Model.) 5 Sheets—Sheet 5.
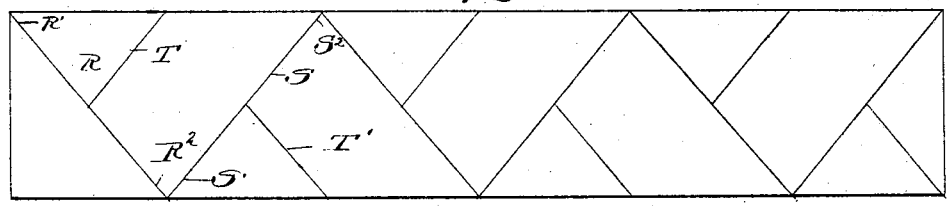
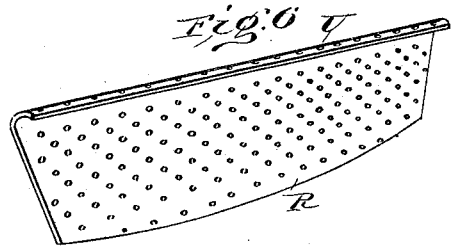
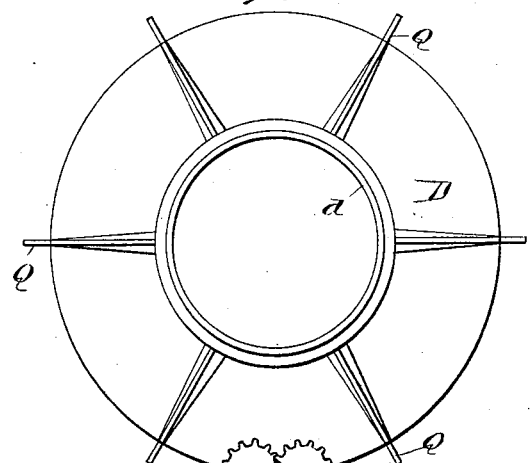
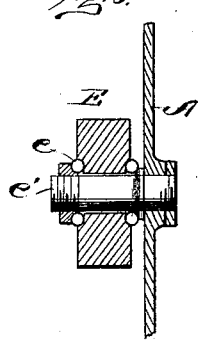
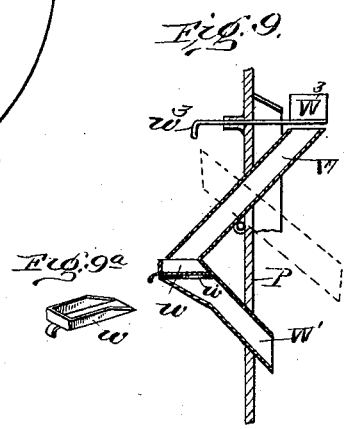
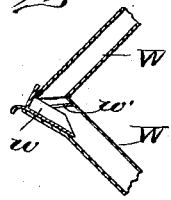
Witnesses:
J. M. Fowler Jr.
J. B. Peyton, Jr.
Inventor:
Millard F. Hamsley,
by Church & Church
his Attorneys.
THE NORRIS PETERS CO., PHOTO-LITHO., WASHINGTON, D. C.

UNITED STATES PATENT OFFICE.

MILLARD F. HAMSLEY, OF NEW YORK, N. Y.

APPARATUS FOR ROASTING COFFEE-BERRIES.

SPECIFICATION forming part of Letters Patent No. 616,790, dated December 27, 1898.

Application filed February 8, 1898. Serial No. 669,582. (No model.)

*To all whom it may concern:*

Be it known that I, MILLARD F. HAMSLEY, of New York, (Brooklyn,) in the county of Kings and State of New York, have invented certain new and useful Improvements in Apparatus for Treating Coffee-Berries and the Like; and I do hereby declare the following to be a full, clear, and exact description of the same, reference being had to the accompanying drawings, forming a part of this specification, and to the letters of reference marked thereon.

This invention relates to improvements in apparatus for treating coffee and like berries to roast or dry the same, and it relates particularly to that class of apparatus wherein the berries are carried within a foraminous cylinder during their treatment and subjected to a tumbling action, so as to expose the whole mass within the cylinder uniformly to the action of the heat and air-currents passing through the cylinder.

The invention has for its object to provide a simple and easily-operated apparatus which will not only give more uniform results in the product, but will effectually remove from the berries and convey away the hulls and dirt ordinarily mixed with the crude material.

With the above objects in view the invention consists in certain novel details of construction and combinations and arrangements of parts, all as will be now described, and pointed out particularly in the appended claims.

Referring to the accompanying drawings, Figure 1 is a front elevation of an apparatus embodying my present improvements, with portions broken away to show the exhaust-openings and dampers. Fig. 2 is a rear elevation of the same apparatus. Fig. 3 is a longitudinal vertical section taken centrally of the apparatus with portions shown in elevation. Fig. 4 is a section taken at right angles to Fig. 3, looking toward the front end of the machine. Fig. 5 is a detail diagrammatic view illustrating the arrangement of the flights in the cylinder if extended in a plane. Fig. 6 is a detail perspective view of one of the flights. Fig. 7 is an end elevation of the cylinder alone, showing the cog-wheels for operating the discharging-doors. Fig. 7$^a$ is a detail section taken transversely through the bottom of the cylinder to show the discharging-doors. Fig. 8 is a detail sectional view of one of the antifriction-rollers for supporting the cylinder. Fig. 9 is a detail sectional view of the preferred form of sampling device. Fig. 9$^a$ is a perspective view of the tray in which the samples may be caught. Fig. 10 is a detail section illustrating the position of the tray when the sample is to be returned to the cylinder.

Like letters of reference in the several figures indicate the same parts.

The letter A indicates the casing of the machine, which may be formed of sheet metal and provided with an opening or pit B beneath the same, into which a car or like receptacle C may be run to receive the product of the apparatus and convey it away for future treatment. At each end of the casing A it is provided with relatively large central openings, through which flanges or enlarged open trunnions $d$ of the cylinder-heads D project. The cylinder-heads D are connected by a cylindrical foraminous sheet D', which parts constitute the cylinder proper within which the berries are treated. The flanges or trunnions $d$ of the cylinder projecting through the walls of the casing rest upon antifriction-rollers E, preferably supported on roller or antifriction bearings $e$, carried by a stud-axle $e'$, projecting from the casing A. Thus the cylinder itself is free to rotate and so tumble its contents about in the manner to be presently described. At the rear end of the cylinder the head D is provided with a relatively large gear-wheel or circular rack D$^2$, with which a pinion D$^3$ on the drive-shaft D$^4$ meshes. The shaft D$^4$ in turn is driven by a belt D$^5$, running on a fast-and-loose-pulley arrangement D$^6$ in the ordinary way, and in addition the shaft D$^4$ carries at the front end a hand-wheel D$^7$, by means of which the cylinder may be turned or rocked by hand when the belt is on the loose pulley, thereby permitting of a hand manipulation to insure the discharge of the whole body of material from the cylinder when the discharging-doors $d^3$, Fig. 7$^a$, are opened. These doors $d^3$ are mounted on shafts $d^4$, carrying at one end meshing gear-wheels $d^5$, to one of which a key $d^6$, Fig. 3, may be applied through an opening $d^7$ in the casing.

Passing through a foraminous diaphragm F in the large central opening in the rear end of the cylinder are three gas-burners G, which are supplied with gas from a pipe G', having branches G² entering the air-pipes G³, leading to the burners. These air-pipes G³ are supplied with the requisite amount of air to insure complete combustion and a blue flame by means of a blower G⁴, driven from a counter-shaft H, which shaft H is in turn driven by a belt h from the drive-shaft D⁴. The supply of gas is regulated by a series of cocks g, controlled by rods g', extending out to the front end of the machine and having handles g² thereon, as shown clearly in Fig. 3. For the purpose of igniting the gas issuing from the burners a pivoted igniter I is mounted in such position as to pass through the diaphragm F to a point in front of the burners, and this pivoted igniter, which burns a very small flame ordinarily, may be left lighted all the while and its movement controlled by a rod i, also passing out to the front of the apparatus. If desired, this igniter may control in its movement a cock which will admit more gas when it is projected within the cylinder than at other times, as is well known in the art of igniting, and hence I have not deemed it necessary to illustrate in detail more than a diagrammatic view of the cock, as at I'. The berries or crude material is fed to the cylinder through the foraminous diaphragm F by means of a chute K from any suitable source of supply, and in this connection it will be noted that the said diaphragm F is supported in the opening or hollow trunnion in fixed position by arms f, extending around the flange or trunnion d and secured to the casing A. At the opposite or front end of the apparatus I mount and connect the exhaust mechanism for drawing off the fumes generated by the roasting or drying material and also the hulls and dirt separated therefrom in the drying and tumbling processes. In the preferred form the front end of the casing is provided with a series of exhaust-openings M, arranged, preferably, four on each side around the periphery or the peripheral line of the cylinder and adapted to be opened or closed in series of two by segmental sliding dampers m, operated by racks and pinions m' and a key m², which may be applied to the end of the pinion-shaft projecting through the casing or, more properly, through the curved conduit N, which surrounds the end of the casing and into which the exhaust-openings open. The curved conduits N at their lower ends are provided with doors n for removing any accumulations of hulls or dirt therein, and at their upper ends they merge in a central flue or stack N', leading off to any suitable point, but preferably having a reverse curve N², Fig. 3, in the elbow of which an exhaust-fan O, mounted on a shaft O', is adapted to work. The fan O is driven by a pulley and belt O² from the counter-shaft H and is preferably rotated at a relatively high speed, so as to create a strong draft. The central opening or hollow trunnion at this front end of the cylinder is closed by a fixed head P, supported in place by arms p, similar to the arms f, supporting the diaphragm F. The head P is centrally apertured, and a duct N³, communicating with this aperture, leads up into the base of the stack N' and is provided with a damper N⁴ for admitting a greater or less amount of air into the stack, and thereby controlling the draft or passage of air through the cylinder proper.

An air-space is left around the foraminous cylinder within the casing A, and in order to insure a proper draft of air through all portions of the cylinder and out through the openings into the flues N, I preferably provide the cylinder itself with a series of wings or vanes Q, Figs. 3, 4, and 7, which are of a width approximately corresponding to the width of the air-space, and hence form a series of movable partitions, dividing the air-space into flues, which open on the one side and end into and around the cylinder and at the opposite end into the flues or ducts N, the result being that the suction through the stack N' draws the air through the foraminous sheet forming the cylinder and with it all of the fumes, hulls, and dirt from the material being operated upon. The flues or ducts N being somewhat large in cross-sectional area the heavier particles carried by the draft of air will drop down to the bottom or lower ends of the said flues or ducts and prevent accummulations in the stack, which might be a source of danger by catching fire.

The heat for roasting or drying the berries or material in the cylinder is generated by the gas-flame issuing from the burners G, and one of the important features of my present invention consists in a mechanism for properly shifting the load of material carried by the cylinder back and forth from one end to the other and passing it through the gas-flame by elevating it and discharging it at a point above the flame, whereby exceedingly uniform and quick results are attained. In carrying this feature of my invention into practice I provide the interior of the cylinder with a series of foraminous flights, which are inclined or arranged spirally at such angles as to insure a uniform and quick transfer of the body of material or berries from one end to the other of the cylinder and at the same time a complete and thorough commingling or mixing of the same. The flights are arranged, preferably, in two series, one series extending diagonally from end to end of the cylinder and the other series meeting the first series at an intermediate point and being each of one-half the length of each of the flights of the first series. The arrangement will be best understood by reference to Fig. 5, which is a diagrammatic view on a plane surface, showing the arrangements of the flights, and in this view the top and bottom lines indicate the ends of the cylinder, and the long diagonal lines R and S indicate the flights of the first series, which extend from end to end of the cylinder at alternately opposite inclinations—that is to say, the flight R at one end of the cylinder meets the end of the flight S, and the latter at its opposite end meets the next flight, which is inclined in the same direction as the flight R. From an intermediate point on the head of the cylinder between the separated ends of the flights R and S one of the second series of flights (lettered T) projects and intersects the flight R at approximately its center point, and in the next space between the separated ends of the next pair of flights R and S another short flight T' is similarly arrranged and intersects or meets the flight S at an intermediate point. Each of the flights is formed of foraminous material, as shown clearly in Fig. 5, and each has its edge toward the center of the cylinder curved over, as at U, to form a trough on the rising side of the cylinder, which will retain a greater quantity of material than would be possible with a substantially flat flight, and carrying the same to a higher point, where it will be distributed as the flight assumes a more vertical position and allowed to drop through the gas-flame in a continuous stream rather than in a solid body.

To more effectually secure a quick transfer of the body of material from one end of the cylinder to the other, the flights are preferably made wide at one end and narrow at the opposite end. Thus, again referring to Fig. 5, the end of the first flight R (marked R') is wide, while the end marked $R^2$ is narrow, and the end of the flight S (marked S) or joining the end $R^2$ of the flight R is made wide and the end $S^2$ narrow, while each of the flights T is made wide at the end nearest the head of the cylinder and of a height at the opposite end corresponding to the height of the flight R or S at the point where it joins the same.

By making the flights of foraminous material danger of scorching the berries is to a large extent obviated, and in order to prevent the berries from falling too close to the hollow trunnions of the cylinder I preferably mount on the heads F and P curved guards V, which will deflect the berries at this point toward the center of the cylinder.

It is highly desirable during the progress of a roast to secure a sample or samples of the material from the interior of the cylinder in order to determine when the process has been carried far enough, and with this object in view I mount a sampling device in the head P of the cylinder, which sampling device in its preferred form is shown particularly in Figs. 3, 9, $9^a$, and 10, and it consists, essentially, of a tube W, pivoted in the head P at an intermediate point in its length and so as to project within the cylinder at one end and outside of the hollow trunnion at the opposite end. By turning this tube W up to the position indicated in full lines in Fig. 9 a small quantity of the material within the cylinder will be caught in its open end and, passing down through the tube, may be received in any suitable receptacle held by the attendant—such, for instance, as the tray $w$—or, if desired, when the tube W is in this position its lower end may join a return-tube W', which will lead the material back into the cylinder at a lower point, and the condition of the material may be observed as it passes the opening between the two tubes W and W'. A shelf $w'$ is preferably formed in this return-tube W' to hold the tray $w$ and catch a sample, and when the sample has been examined the tray may be slipped back into the tube W' at an inclination, as shown in Fig. 10, and the sample returned to the cylinder. Should it be desired to throw the sampling device out of action entirely, the tube W may be turned up to the position indicated in dotted lines in Fig. 9 and the quantity of material which is allowed to pass into the open end of the tube when it is in the position shown in full lines in this figure may be controlled by a pivoted damper $W^3$, having a handle $w^3$ projecting out to the front of the machine.

To properly dampen or treat the material or berries within the cylinder, I preferably project the steam-pipe X through the rear end of the same, and, if desired, a supply of polishing or casing material may be arranged in any suitable receptacle—for instance, as at X', Figs. 2 and 3—and a pipe $X^2$ leading therefrom may open into the steam-pipe for discharging the polishing material and steam simultaneously. Both the supply of polishing material and steam may be controlled by suitable stop-cocks, such as Y Y', if desired.

In operation a suitable quantity of material or coffee is discharged into the cylinder through the spout K, when the supply is cut off, the gas-flames ignited, and the cylinder rotated in a proper direction to elevate the material and drop the same through the gas-flame and at the same time transfer the material back and forth from one end to the other of the cylinder. The pipe $N^3$, opening out at the center of the cylinder, insures a steady and uniform draft and an elongated flame through the center of the cylinder, through which flame the material is dropped, and the condition of the material may be seen at any time by means of the sampling device before referred to. When the treatment is completed, the gas is cut off and the rotation of the cylinder stopped with the discharging-doors at the bottom. Said doors are then opened by means of the key $d^6$ and the material dumped into the car C, which has previously been run in beneath the machine. The car C is preferably made with a foraminous bottom $C^6$, beneath which is an air-space $C^7$ for drawing off the hot air and cooling the mass of material contained within the car. This may be readily accomplished by any suction apparatus desired.

Having thus described my invention, what I claim as new, and desire to secure by Letters Patent of the United States of America, is—

1. In an apparatus such as described, the combination with the rotary foraminous cylinder, with means for heating the same and entrance and discharge openings for the material, of a casing inclosing said cylinder with a space between the periphery of the cylinder and casing, a flue or duct at one end of said casing and discharge-passages arranged in the end of the casing around the periphery of the cylinder and opening into a discharge flue or duct; substantially as described.

2. In an apparatus such as described, the combination with the rotary cylinder having a solid head with open trunnions and foraminous periphery, of a casing inclosing said cylinder and having exit-apertures arranged in one end around the periphery of the cylinder, an exhaust duct or flue with which said openings communicate and partitions dividing the space between the periphery of the cylinder and casing into chambers communicating with said exit-apertures; substantially as described.

3. In an apparatus such as described, the combination with the rotary cylinder having the hollow trunnions and foraminous periphery, of the casing inclosing said cylinder with an air-space between the periphery of the cylinder and casing, exit-apertures communicating with said air-space and vanes or partitions mounted on the cylinder and dividing said space into chambers; substantially as described.

4. In an apparatus such as described, the combination with the rotary cylinder having a foraminous periphery and means for rotating said cylinder, of a casing inclosing said cylinder, an air-space between the periphery of the cylinder and casing, a series of exit-apertures formed in said casing in substantial alinement with the periphery of the cylinder, a stack or exhaust-flue communicating with said apertures and vanes or partitions mounted on the cylinder and dividing the space between the cylinder and casing into chambers; substantially as described.

5. In an apparatus such as described, the combination with a foraminous cylinder, the casing surrounding said cylinder and having a series of exit-openings around the periphery of said cylinder and means for rotating the cylinder, of a stack or duct communicating with said exit-openings and an exhaust-fan located in said stack or duct; substantially as described.

6. In an apparatus such as described, the combination with the foraminous cylinder having outwardly-projecting annular flanges at each end forming trunnions, a casing inclosing said cylinder and having apertures through which the said trunnions project, antifriction-rollers journaled on the outside of the casing and supporting said trunnions and cylinder and a stack or duct communicating with the interior of the cylinder and with the casing outside of said cylinder; substantially as described.

7. In an apparatus such as described, the combination with the rotary foraminous cylinder, having heads provided with annular outwardly-projecting flanges forming trunnions, a casing inclosing said cylinder and antifriction-rollers mounted on the casing and forming the bearings upon which said trunnions rest, of burners projecting in one of said trunnions, an exhaust-flue opening through the opposite trunnions and exhaust-openings in said casing outside of the cylinder and also communicating with said flue; substantially as described.

8. In an apparatus such as described, the combination with a rotary foraminous cylinder having solid heads and central openings with means for rotating said cylinder, of a foraminous diaphragm located in one of said central openings, an exhaust-flue passing through the other of said openings and burners passing through the foraminous diaphragm; substantially as described.

9. In an apparatus such as described, the combination with the foraminous cylinder, means for rotating said cylinder, an exhaust-flue communicating with the said cylinder and a suction apparatus in said flue, of a gas-burner projecting into one end of said cylinder, a gas-supply pipe communicating with said burner and an air-blast apparatus also communicating with said burner, said burner and exhaust-flue being located centrally of the cylinder at substantially diametrically opposite points whereby the flame from the burner is caused to project across the cylinder; substantially as described.

10. In an apparatus such as described, the combination with the rotary cylinder, the casing inclosing said cylinder and a relatively large annular rack or gear-wheel carried by the cylinder, a pinion meshing with said rack and a shaft for said pinion projecting at both front and rear of the apparatus, the hand-wheel mounted on the front end of said shaft and fast and loose driving-wheels on the rear end of said shaft; substantially as described.

11. In an apparatus such as described, the combination with the foraminous cylinder having a discharge-opening at one side, doors for closing said discharge-opening, shafts upon which said doors are mounted and intermeshing gear-wheels on said shafts for securing simultaneous movement of the doors, and a handle for turning said shaft, of a casing inclosing said cylinder having a discharge-opening at the bottom and means for rotating the cylinder; substantially as described.

12. In an apparatus such as described, the combination with the cylinder having a foraminous periphery, with means for rotating said cylinder and means for heating the same, and withdrawing the fumes therefrom, of flights extending from end to end of said cylinder diagonally in opposite directions and intermediate flights extending from the ends of the cylinder diagonally and terminating against the first-mentioned flights at intermediate points; substantially as described.

13. In an apparatus such as described, the combination with the cylinder, means for rotating the cylinder and means for heating the same and withdrawing the fumes therefrom, of diagonal flights extending from end to end of the cylinder, proximate flights being inclined in opposite direction, and each of said flights being of greater width at one end than at the other; substantially as described.

14. In an apparatus such as described, the combination with the rotary cylinder, with means for heating the same and withdrawing the fumes therefrom, of a casing inclosing the cylinder with means for withdrawing the fumes from said casing, said casing having an opening at the bottom and partitions or vanes for dividing the space between the cylinder or casing into chambers, whereby air entering the bottom opening will be caused to pass through the cylinder; substantially as described.

15. In an apparatus such as described, the combination with the casing, the rotary cylinder mounted therein having a foraminous periphery, means for heating said cylinder and means for withdrawing the fumes from the cylinder and casing, of flights arranged within the casing in oppositely-inclined directions, said flights being wider at one end than at the other and arranged alternately with the narrow end of one flight adjacent the wider end of the proximate flight; substantially as described.

16. In an apparatus such as described, the combination with the casing, a series of exit-openings arranged around one end of said casing, a cylinder having a foraminous periphery located within said casing and means for heating said cylinder, of an exhaust stack or flue communicating with said casing outside of the cylinder and also with the interior of the cylinder and a door or damper for opening communication between the external air and that portion of the flue communicating with the interior of the cylinder; substantially as described.

17. In an apparatus such as described, the combination with a rotary cylinder and casing inclosing the same with means for heating the cylinder and withdrawing the fumes therefrom, of a sampling-tube pivotally mounted at one end of said cylinder and projecting within the same whereby by varying the inclination of said tube samples can be withdrawn from the interior of the tube or not, as desired; substantially as described.

18. In an apparatus such as described, the combination with the casing, a rotary cylinder having a central opening, of a sampling-tube having one end projected into the cylinder through said central opening and a damper for regulating the quantity of material which may enter said sampling-tube; substantially as described.

19. In an apparatus such as described, the combination with the rotary cylinder, having the central opening in one end and a casing inclosing said cylinder of a pivoted sampling-tube mounted in said opening and having one end projected within the cylinder and a return-tube with which the outer end of said sampling-tube registers having its lower end projected within the cylinder for returning the material caught by the sampling-tube; substantially as described.

MILLARD F. HAMSLEY.

Witnesses:
ALEX. S. STEUART,
J. B. PEYTON, Jr.